United States Patent [19]

Tekkanat et al.

[11] Patent Number: 5,106,709
[45] Date of Patent: Apr. 21, 1992

[54] COMPOSITE SUBSTRATE FOR BIPOLAR ELECTRODE

[75] Inventors: Bora Tekkanat; Alan A. Kovacich, both of Milwaukee, Wis.

[73] Assignee: Globe-Union Inc., Milwaukee, Wis.

[21] Appl. No.: 556,357

[22] Filed: Jul. 20, 1990

[51] Int. Cl.⁵ .............................. H01M 4/68
[52] U.S. Cl. .................... 429/210; 429/235; 429/245; 428/328
[58] Field of Search ............. 429/210, 245, 234, 235; 428/328

[56] References Cited

U.S. PATENT DOCUMENTS

| | | |
|---|---|---|
| 3,096,215 | 7/1963 | Voss et al. |
| 3,332,803 | 7/1967 | Tamminen ............... 429/210 X |
| 3,480,479 | 11/1969 | Nestor |
| 3,544,378 | 12/1970 | Broyde |
| 3,871,917 | 3/1975 | Gabano et al. |
| 4,098,967 | 7/1978 | Biddick et al. |
| 4,352,899 | 10/1982 | Tada et al. |
| 4,422,917 | 12/1983 | Hayfield |
| 4,470,898 | 9/1984 | Penneck et al. |
| 4,510,219 | 4/1985 | Rowlette ............ 429/245 X |
| 4,547,443 | 10/1985 | Rowlette et al. |
| 4,770,932 | 9/1988 | Matsumoto et al. ........ 428/328 X |
| 4,861,690 | 8/1989 | Hope et al. ............ 429/245 X |

Primary Examiner—Stephen Kalafut
Attorney, Agent, or Firm—Foley & Lardner

[57] ABSTRACT

A bipolar battery substrate includes overlying layers of binder material containing particulate conductive material. In the most preferred form, one layer includes carbon as the conductive material, while the conductive material for the other layer comprises a conductive form of a transition metal oxide. Electrode structures are also disclosed.

19 Claims, 2 Drawing Sheets

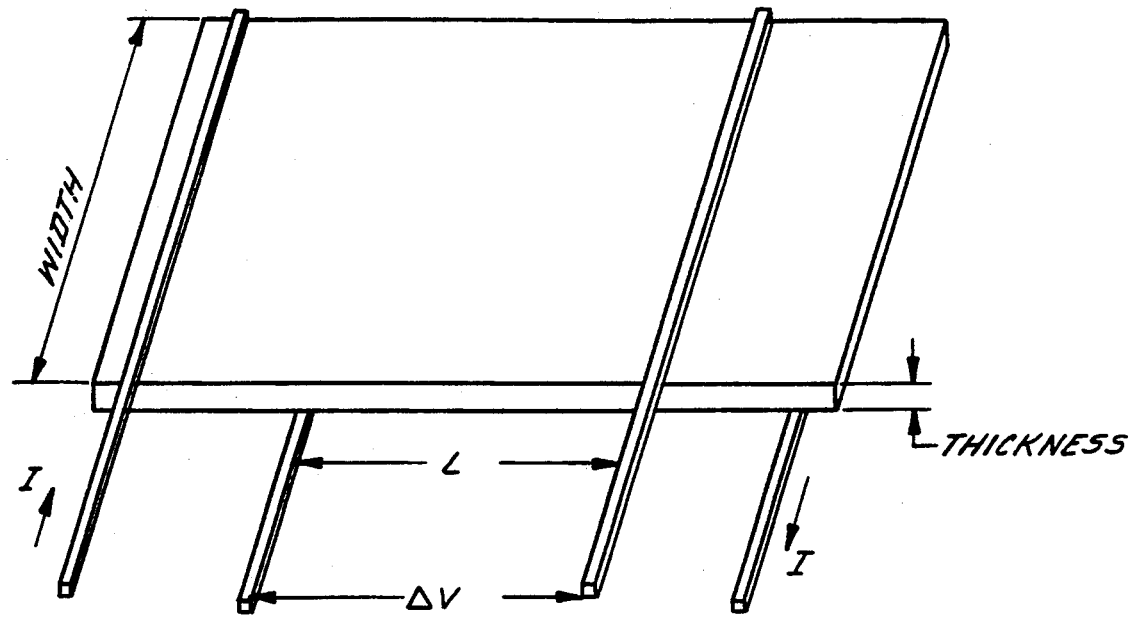
FIG. 1
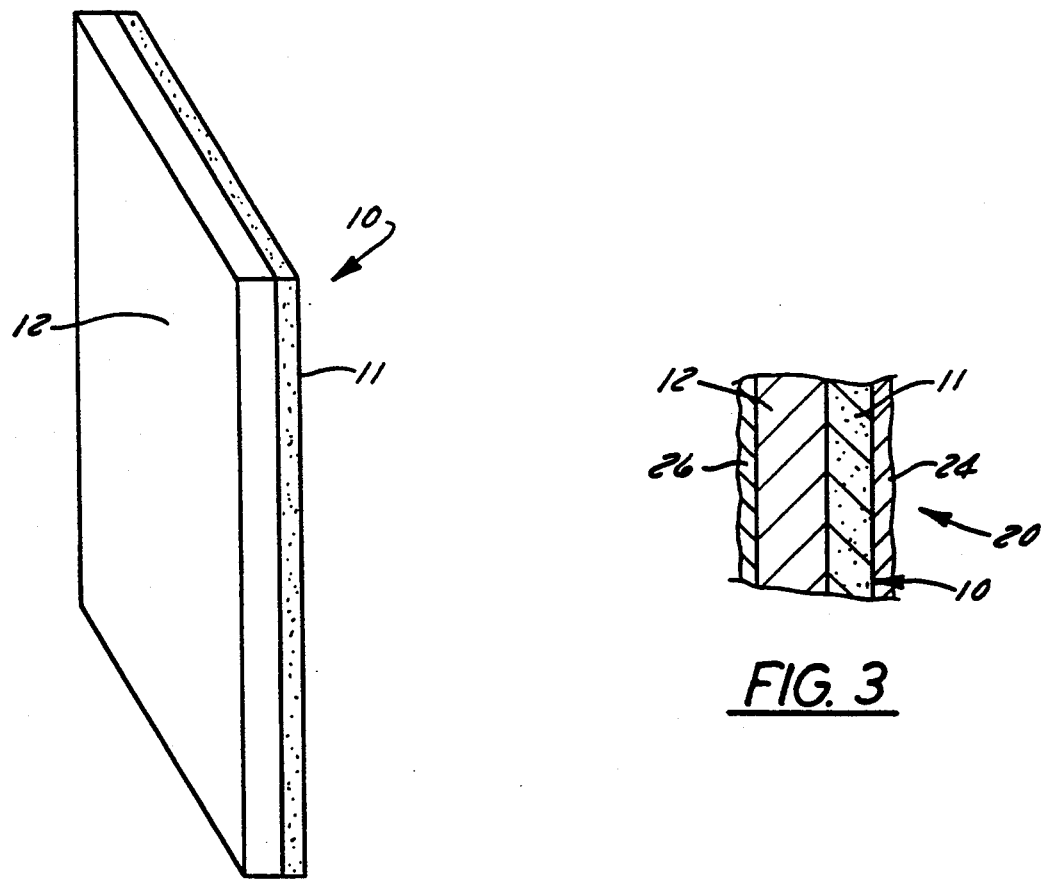
FIG. 2
FIG. 3

COMPOSITE SUBSTRATE FOR BIPOLAR ELECTRODE

TECHNICAL FIELD

This invention relates generally to substrate materials of the type used in bipolar electrodes. More particularly, this invention, in its most preferred form, relates to a composite substrate including laminated layers containing conductive oxide-filled polymeric material and carbon-filled polymeric material, respectively.

BACKGROUND OF THE INVENTION

Bipolar batteries are known to the art to consist generally of a series of bipolar plates separated by separators, each bipolar plate comprising positive and negative electrodes on opposite sides of a conductive substrate. It has been attempted to combine several flat bipolar cells in multi-compartment batteries encased in suitable containers. Many of the substrate materials used heretofore are heavy, and it is desirable to minimize the weight of the substrate to reduce overall battery weight. Prior attempts at providing lighter weight substrate materials have resulted in substrates which are deficient in at least some properties desirable for this application. Moreover, it is necessary that substrate materials be able to withstand prolonged exposure to the harsh environment involved with sulfuric acid electrolytes used in most battery systems.

Perhaps the most common type of substrate employed in the prior art is a thin sheet of lead. In a typical prior art bipolar battery, the lead substrate would have a positive electrode coating on one side (for example, porous lead oxide) and negative electrode coating material on the opposite side (for example, sponge lead active material).

It has been suggested that the overall weight of such batteries could be reduced by the use of carbon filled plastic as the substrate, as exemplified in Biddick, et al., U.S. Pat. No. 4,098,967, issued July 4, 1978 for "Electrochemical System Using Conductive Plastic". In this patent, finely divided vitreous carbon is loaded at a rate of 40–80% by volume into a plastic material, with the filled plastic acting as a bipolar substrate. A layer of lead-antimony foil bonded to the carbon-filled plastic provides the surface for adhering the active materials. A lead sheet can be bonded to the substrate to define a low resistance terminal.

Carbon, however, is not entirely stable, especially as a positive electrode material, because of its tendency to oxidize. Thus, bipolar substrates utilizing carbon as a conductive filler are not generally satisfactory for long-term use.

Unitary plate electrodes comprising fiberglass coated with conductive oxides, for example tin dioxide and lead dioxide, and having a thin film of lead or graphite filled resin, are described in Rowlette, et al., U.S. Pat. No. 4,547,443, issued Oct. 15, 1985. This particular use does not, however, suggest that the transition metal conductive oxides could be used in the manner described herein.

The present invention involves the use of conductive oxides, preferably those of titanium, tungsten, vanadium, molybdenum and niobium. Certain oxides of these transition metals exist or can be prepared in a non-conductive state. Reduction of these non-conductive oxides, such as in a hydrogen atmosphere, at elevated temperatures, creates a conductive class of materials whose use in batteries as described herein has not heretofore been recognized.

Certain conductive metal oxides have been used in other applications, for example, in polymeric compositions for electrical components as described in Penneck, et al., U.S. Pat. No. 4,470,898, issued Sept. 11, 1984, and in corrosion-resistant coatings as described in Tada, U.S. Pat. No. 4,352,899, issued Oct. 5, 1982.

Voss, et al., in U.S. Pat. No. 3,096,215, issued July 2, 1963, discloses the use of a sintered titanium dioxide electrode, impregnated with silver, for use as an auxiliary electrode for eliminating gases formed during operation of a battery. The auxiliary electrode is coupled electrically to the positive or negative plates of the battery, depending on which electrode is causing the problem gas generation. Voss, et al. do not suggest the use of any metal oxides in a polymeric binder for use as a substrate material in bipolar electrodes.

Certain metal oxides have also been suggested for use in fuel cells to serve as substitutes for more expensive platinum as a catalyst material. See Nestor, U.S. Pat. No. 3,480,479 issued Nov. 25, 1929 (a molybdenum oxide mixed with tungsten disulfide) and Broyde, U.S. Pat. No. 3,544,378 issued Dec. 1, 1970 (a rare earth tungsten oxide $M_xWO_3$ where x is between 0 and 1 and M is a rare earth element). These catalyst oriented patents do not suggest the use of such materials in bipolar battery substrates.

An oxygen reducing negative active material for a storage cell which includes a molybdenum oxide having an average valency between 4 and 6 is discussed in Gabano, et al., U.S. Pat. No 3,871,917 issued Mar. 18, 1975. The oxide is supported by mechanical compression. A conductive body (for example, graphite) and binding agents may be employed. The material is used with conventional positive electrode systems (i.e., $PbO_2/H_2SO_4/PbSO_4$), and thus does not suggest the uses contemplated by the present invention.

Further, the use of bulk titanium oxide having the formula $TiO_x$ where x is 1.55 to 1.95 has been suggested for electrode use in electrochemical cells. See, Hayfield, U.S. Pat. No. 4,422,917 issued Dec. 27, 1983. Only solid, bulk materials are discussed for electrode applications including storage batteries, electrochemical cells for chlorate production, etc.

A pair of co-pending, commonly assigned applications, Ser. No. 07/345,993 filed May 2, 1989, now U.S. Pat. No. 5,045,170, to Bullock et al. or 07/426,580 filed Oct. 24, 1989, now U.S. Pat. No. 5,017,446, to Reichman, et al. describe the use of certain conductive oxides as electrode materials and suggest the use thereof in a plastic binder as a bipolar substrate additive. Neither application suggests the use of such a substrate material along with an adjoining layer of carbon-filled plastic The present invention provides a novel substrate structure for use in bipolar batteries which is not appreciated by the foregoing art and which overcome the deficiencies of the aforementioned systems.

SUMMARY OF THE INVENTION

The invention provides a composite for use as a substrate for bipolar lead-acid batteries which includes a polymeric binder with a carbon filler on the negative side and a polymeric binder with a conductive oxide filler on the positive side. Methods for preparing such composite substrate materials are also disclosed. Bipolar batteries which include positive and negative active material disposed on opposite sides of the composite substrate are included in a further aspect of the invention.

Carbon, particularly carbon black, offers the advantages of low cost, light weight, good conductivity, good adhesion and acid stability in a lead-acid battery environment. However, carbon has poor stability when used on the positive side in a lead-acid bipolar battery. The heavier, more costly conductive metal oxides according to the invention, described below, are useful on both the positive and negative sides. Accordingly, a bilayered substrate for a bipolar, lead-acid battery utilizes the advantages of both carbon and conductive metal oxides in a single plate by providing a layer containing carbon on the negative side and a layer containing a conductive metal oxide on the positive side.

BRIEF DESCRIPTION OF THE DRAWINGS

The invention will be further described with reference to the accompanying drawings, wherein like reference numerals denote like elements, and:

FIG. 1 is an illustration of the four point resistivity measurement technique;

FIG. 2 is a perspective view of a composite laminated bipolar substrate according to a preferred embodiment of the present invention;

FIG. 3 is a cross-sectional view of the substrate of FIG. 2 used in a representative bipolar lead-acid battery.

DETAILED DESCRIPTION

Figure 4:
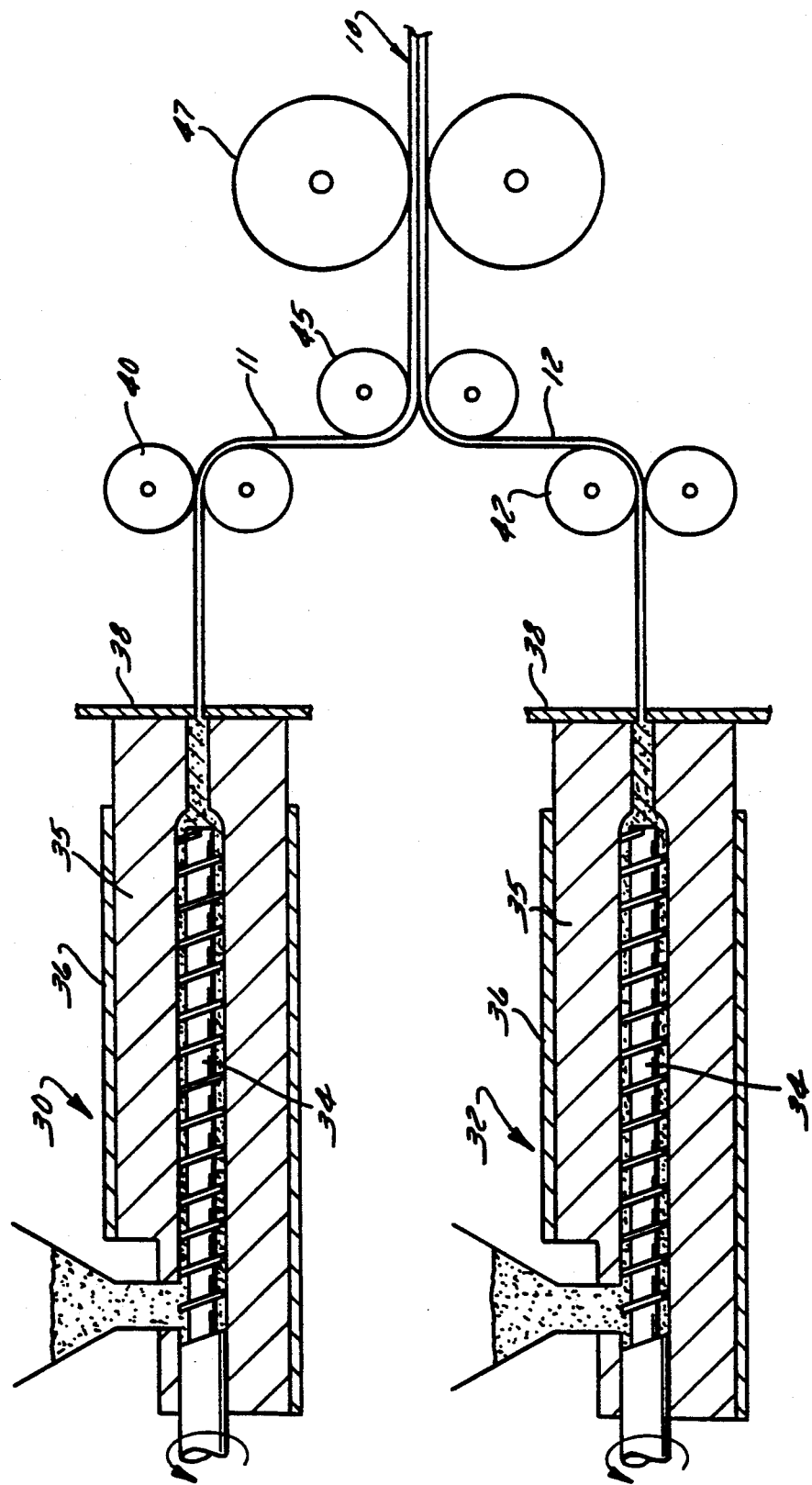
FIG. 4 is a diagramatic representation of a coextrusion process used for forming the composite laminate according to the preferred embodiment of the invention.

According to the present invention, an electrically conductive oxide selected from the class of inorganic oxides generally known as being non-conductive are used in a first layer of a composite substrate material. For such use, the oxide must first be converted to a conductive state. For purposes of the present invention, "conductive" means a conductivity of at least about 0.1 ohm$^{-1}$cm$^{-1}$, preferably at least about 10 ohm$^{-1}$cm$^{-1}$. The processes for converting the oxides to their conductive state are described below.

Second, the oxide should be stable in water and aqueous sulfuric acid solutions. For purposes of the present invention, "sulfuric acid-resistant" means stable in dilute aqueous sulfuric acid having a specific gravity in the range of about 1 to 1.4, as commonly used in lead-acid batteries, at temperatures in the range of about −40° C. to 80° C. Stability in up to 12 molar sulfuric acid solution at such temperatures is preferred. If the oxide is attacked by the acid electrolyte, the structure of the layer in which it is contained will be adversely affected.

Finally, the oxide should preferably be electrochemically inert, i.e., it should not participate in the electrochemical reaction occurring in the battery or electrolytic process. Absent this characteristic, the oxide has no lasting effects in the battery or is consumed as part of the electrolytic process.

Few inorganic oxides have all of the foregoing characteristics Several are described in commonly owned, U.S. Pat. No. 5,045,170, entitled "Electrodes Containings Conductive Metal Oxides" by N. K. Bullock and W. Kao. Barium metaplumbate is the preferred material in that application which principally involves perovskite structure oxides of the formula $$A_a B_b O_c$$

wherein A is Sr, Ba, Zn, Cd, Ra or a combination thereof, B is Zr, Sn, or Pb, and $0.5 \leq a \leq 1$, $0.5 \leq b \leq 1$, and $2 \leq c \leq 3$, optionally containing small amounts of other elements such as Bi, Ag, K, Li, Ti, Nb, Al, Cr, Zn, Mn, Mg or Ca, and the resulting compound is substantially stable in sulfuric acid solution without generating excessive oxygen when used in a positive electrode, or without reacting to generate excessive hydrogen if used as a negative electrode.

The transition metals include elements from Sc to Cu, Y to Ag and Hf to Au in the first, second and third series, respectively. A variety of transition metal oxides can be prepared which are both sulfuric acid resistant and electrically conductive. These compounds tend to be transition metal oxides wherein the metal is in an oxidation state lower than its group oxidation state. For example, the transition metals of Groups 4, 5 and 6 typically form $V_2O_5$, and $Nb_2O_5$. In each of these compounds the metal is in its group oxidation state, namely (IV) for Ti, (V) for V and Nb, and (VI) for W. By contrast, reduced metal oxides, such as TiO, Ti$_2$O$_3$, VO, V$_2$O$_3$, VO$_2$, WO$_2$, W$_2$O$_5$, MoO$_2$, Mo$_2$O$_5$, and NbO$_2$, wherein the metal atom is in an oxidation state lower than its group oxidation state, are electrically conductive.

In the present invention oxides of titanium, tungsten, molybdenum, vanadium and niobium which are non-conductive in their most stable form, i.e. when the metal is in its group oxidation state, can be converted to conductive metal oxides by, for example, reducing stoichiometric powders in a hydrogen atmosphere at elevated temperatures. Such techniques are, in and of themselves, well known and need not be described in detail herein (see, for example, the aforementioned Gabano and Hayfield patents).

For definitional purposes, the materials which are useful in the present invention will be described as "conductive metal oxides". The most preferred conductive metal oxides for use in the invention include conductive metal oxides of titanium, tungsten, molybdenum, vanadium and niobium represented by the formulas TiO$_{2-x}$, WO$_{3-x}$, MoO$_{3-x}$, V$_2$O$_{5-x}$ and Nb$_2$O$_{5-x}$ where x is greater than 0 and less than or equal to 1, particularly about 0.001 to 1, mixtures thereof, and the conductive mixed oxides of these elements. For V$_2$O$_{5-x}$, x may range from 0.001 to 3, although the range of 0.001 to 1 is preferred.

The reduction temperatures used for the preparation of the various conductive metal oxides may vary between about 300° C. to over 1000° C., and the amount of reduction may be selected to optimize conductivity properties for the desired application. As will more fully be discussed below, when binders are used, resistivity may be controlled by varying both or either the stoichiometry or the percentage of the conductive oxide used in the binder. For example, using a conductive tungsten oxide WO$_2$ (commercial grade, for example), resistivity drops from 1.70 ohm-cm at 22.5% (volume percent) in a polyethylene binder to 0.033 ohm-cm at 53.8% (volume percent) conductive oxide powder. Particle size, shape, and distribution will also affect resistivity.

The conductive oxide according to the present invention is used as a filler material in a first portion of a composite bipolar electrode substrate for a bipolar battery of the type shown, for example, in Biddick, U.S. Pat. No. 4,098,967, or Poe, U.S. Pat. No. 3,795,543, the entire contents of which patents are expressly incorporated herein by this reference. To fulfill such use, the conductive metal oxides are dispersed in a sulfuric acid-resistant plastic matrix as fine particles. Average particle size of the conductive oxides used in the preferred embodiment of the invention are in the range from about 0.1 to 300 microns, preferably from about 0.1 to 40 microns, and more preferably from 0.1 to 5 microns. For purposes of the present invention, polyethylene, polypropylene, fluorinated derivatives thereof, and similar plastics having suitable strength and resistance to sulfuric acid can be used. In particular, a preferred high-density polyethylene (HDPE) according to the invention has a molecular weight of from 200,000 to 300,000, a peak melting point of about 135° C. or higher, and a strength of from 3000 to 5000 psi. Such plastic also typically has a conductivity of about $10^{-16}$ ohm$^{-1}$ cm$^{-1}$, a density of about 0.96 g/cm$^3$, and an elastic modulus of about 50,000–80,000 psi. The conductive oxide is used in an amount preferably from about 10 to about 95% by volume, particularly from about 15 to about 60% by volume when used on the positive side in the bipolar electrode environment.

While in the aforementioned Reichman co-pending application an illustrated bipolar battery includes a conductive oxide-binder layer as a substrate, in the present invention the conductive oxide filled material is used to9ether with a separate, adjoining polymeric layer containing another dispersed conductive material, most preferably carbon. The polymeric binder of this adjoining layer preferably has the same properties as those set forth above for the conductive oxide layer. The filling rates for the carbon are also similar to those used for the conductive oxide, although generally higher amounts of carbon may be necessary to achieve the desired conductivity. Carbon black is especially preferred, as opposed to vitreous carbon or graphite.

The processing of the conductive materials oxides and carbon) with the binders consists primarily of compounding and forming steps. In certain aspects of the invention the compounding can be carried out in an extruder or melt blender, and extrudates can be supplied in pellet form. The materials can also be formed by injection or compression molds (as examples) into the desired final shape or can be extruded into continuous sheet form and then cut into the desired shape, size and configuration. Similarly, lamination of the two components can be carried out as a batch process by compression molding or as a continuous process by coextrusion as shown in FIG. 4. The bipolar substrates, in fact, may be manufactured continuously in an efficient manner by coextrusion, thus eliminating the need for separate compounding, molding and lamination steps.

The proper selection of processing steps and components is important in achieving the most desirable results according to the present invention. The following examples serve to illustrate the performance criteria.

EXAMPLE 1

Small lab size specimens of positive material (conductive oxide and binder) were first prepared to optimize the filler loading levels for the desired conductivity. A high melt index (MI=40) grade high density polyethylene was used to facilitate the mixing process. It was allowed to melt gradually on a 370° C. hotplate and measured amounts of tungsten oxide were added gradually to yield various concentrates. The various mixtures were melt blended thoroughly and then placed into a preheated mold to form the specimen by a Carver press. The resistivities of the various filler loadings were measured by the four point technique as follows:

| FILLER TYPE | FILLER LOADING (volume percent) | RESISTIVITY (Ω-cm) |
|---|---|---|
| Tungsten oxide | 10.0 | very high |
| " | 20.0 | 1.7014 |
| " | 23.0 | 0.6622 |
| " | 25.0 | 0.3121 |
| " | 30.0 | 0.2959 |
| " | 50.0 | 0.0327 |

The four point technique is illustrated in FIG. 1 where L=distance between two inner probes; I=applied current; R=resistance (ΔV/I); ΔV =measured voltage drop; and A=Area (thickness × width).

$$\text{Restivity (ohm-cm)} = \rho = \frac{RA}{L}$$

EXAMPLE 2

Particle size was investigated, with a range of 1–125 microns being studied Particles in the 5–10 micron size range gave the lowest resistivity for the same filler loading.

EXAMPLE 3

Chemical stability was also studied by mixing several tungsten oxide compositions (1 gram) with one gram of reagent grade PbO$_2$. 50 ml of 1.305 specific gravity sulfuric acid was then added to the container. After holding at 60° C. for seven days the solids were filtered through a 1 micron opening filter and washed with 50 ml of water. The filtrate and washing liquid were saved and the volume was adjusted to 150 ml. The electrolyte was then analyzed by an Inductively Coupled Plasma (ICP) emission spectrometer for content. The results are given below.

| FILLER TYPE | TEST TEMP. (°C.) | TEST TIME (days) | CONCENTRATION OF TUNGSTEN (ppm) |
|---|---|---|---|
| WO$_2$ | 60 | 7 | 66 |
| WO$_{2.72}$ | 60 | 7 | 49 |
| WO$_{2.9}$ | 60 | 7 | 44 |

EXAMPLE 4

Onset potential of oxygen evolution for a one-component electrochemical cell was determined using several compositions of tungsten oxide filled sheets as prepared in Example 1 immersed in a large quantity of sulfuric acid of 1.305 specific gravity, with a lead spiral counter electrode and a Hg/Hg$_2$SO$_4$ reference electrode. A potential was applied from a potentiostat to the working electrode against the reference electrode. The applied potential was scanned first anodically from the rest potential of the working electrode to a positive value of >2V then scanned back to about 0 V. The onset potential of oxygen evolution was defined to be the foot potential of a rising current in the anodic scan which was accompanied with gas evolution at the electrode surface. This potential was then compared with the reduction potential of $PbO_2$, 1.25V. If the onset potential of oxygen evolution for the working electrode is higher than 1.25V, spontaneous oxygen evolution will not occur when the material is in contact with $pbO_2$ in the same electrolyte. The onset potential of oxygen for this particular tungsten oxide filled electrodes was found to be 1.6V.

EXAMPLE 5

Electrochemical stability tests were conducted with a constant voltage of 1.35V versus the $Hg/Hg_2SO_4$ reference electrode applied to the working electrode of Example 4 for a period of time varying from a few hours to a few days. No significant change of resistivity was observed It was concluded that the tungsten oxide filled layers were stable and compatible with $PbO_2$.

EXAMPLE 6

The electrochemical stability of carbon black components was tested as in Example 5 using high density polyethylene with certain quantities of other fillers, i.e. glass fibers, and the results are depicted below.

| COMPOSITION | ELECTROCHEMICAL STABILITY OF CARBON BLACK COMPOSITIONS | | |
|---|---|---|---|
| | Resistivity ($\Omega$-cm) | | |
| | Before Polarization | After Polarization | # of Days Polarized |
| HDPE + 18% CB | 0.91 | 0.91 | 2 |
| | | 0.91 | 3 |
| | | 0.91 | 4 |
| | | 0.91 | 9 |
| HDPE + 19% CB 10% g. fibers | 0.61 | 0.61 | 1 |
| | | 0.65 | 4 |
| | | v. high | 7 |
| HDPE + 19% CB 10% g. fibers | 0.54 | 0.56 | 1 |
| | | 0.56 | 2 |
| | | v. high | 4 |
| | | v. high | 7 |
| | | v. high | 10 |
| PP-Copolymer + 19% CB | 0.77 | 0.77 | 3 |
| | | v. high | 9 |
| HDPE + 10% CB 30% graphite | 0.70 | 0.70 | 2 |
| | | 0.70 | 4 |
| | | 0.72 | 9 |

(CB = Carbon Black)

Referring now to FIG. 2 a bipolar substrate 10 of the preferred embodiment of the present invention generally comprises a laminated substrate of the type described above including a positive layer 11 and a negative layer 12. Positive layer 11 is the conductive oxide binder layer previously referred to, while the negative layer 12 is a carbon-filled layer. As seen in FIG. 3, a bipolar battery 20 is prepared by, for example, pasting positive active lead material 24 onto side 11 of components 10, while a negative active lead material 26 is pasted on layer 12. See the above referred Biddich and Poe patents for more detailed descriptions of these active materials.

One example showing the preparation of bipolar substrate 10 is shown in FIG. 4 where the positive and negative materials are first compound in separate, adjacent extruders 30 and 32, each extruder including a screw 34, a barrel 35 and a surrounding heating element 36. A pair of dies 38 form the laminate sheets 11 and 12 having the desired thickness (preferably 0.025 to 2.50 mm and even more preferably 0.125 to 0.625 mm) which then pass through respective pairs of calendaring rolls 40 and 42 and then through downstream laminating rolls 45 and 47 to create the laminate 10 having a desired thickness.

The substrate of the invention provides a light weight, thin and stable (electrochemically and chemically) composite which is impervious to electrolytes used in lead acid batteries and which is strong, tough, easy to process and which may be tailored to the specific needs of the battery designer. While certain preferred materials are described above, the present invention has only been illustrated thereby, while the scope of the invention should be defined solely by the claims which follow.

What is claimed is:

1. A laminate including a first layer comprising a particulate conductive metal oxide dispersed in a resin binder and a second layer comprising a second particulate conductive material dispersed in a resin binder, said conductive metal oxide being selected from the group consisting of barium metaplumbate and the conductive oxides of titanium, tungsten, vanadium, niobium and molybdenum.

2. The laminate of claim 1 wherein said conductive metal oxide is barium metaplumbate.

3. The laminate of claim 1 wherein said resin binder is a polyolefin.

4. The laminate of claim 1 wherein the particle size of said conductive metal oxide is in the range of 0.1–300 microns 5. The laminate of claim 4 wherein the particle size is substantially in the range of 0.1–40 microns.

6. The laminate of claim 1 wherein said first layer comprises 10–95 parts by volume of said conductive oxide and 5–90 parts by volume of said binder.

7. The laminate of claim 1 wherein said conductive material comprises carbon.

8. The laminate of claim 7 wherein said second layer comprises 10 to 95 parts by volume of said carbon and 90 to 5 parts by volume of said binder.

9. The laminate of claim 7 wherein said carbon has a particle size in the range of about 1 to 300 microns.

10. The laminate of claim 9 wherein said carbon has an average particle size in the range of about 0.1 to 40 microns.

11. The laminate of claim 1 wherein the thickness of said first layer is between about 0.025 mm and about 2.50 mm.

12. The laminate of claim 1 wherein the thickness of said second layer is between about 0.025 mm and about 2.50 mm.

13. A bipolar electrode for an electrochemical system comprising a sheet substrate having a first positive electrode material applied to one face thereof and a second negative electrode material applied to the second face thereof, said substrate comprising a laminate including a first layer including a particulate conductive oxide dispersed in a resin binder and a second layer including a second particulate conductive material dispersed in a resin binder.

14. The electrode of claim 13 wherein said conductive oxide is selected from the group consisting of the conductive metal oxides of titanium, tungsten, vanadium, niobium and molybdenum.

15. The electrode of claim 13 wherein said conductive oxide is barium metaplumbate.

16. The electrode of claim 13 wherein said resin binder is a polyolefin.

17. The electrode of claim 13 wherein said second conductive material comprises carbon.

18. In a bipolar electrode for use in a lead-acid battery, including a conductive sheet substrate having layers of positive and negative active materials disposed on opposite sides thereof, the improvement wherein:

the substrate is a laminate including a first layer on which the positive active material is deposited, the first layer consisting essentially of a sulfuric-acid resistant plastic having particles of a conductive, sulfuric acid-resistant metal oxide dispersed therein, and a second layer on which the negative active material is deposited, the second layer consisting essentially of a sulfuric-acid resistant plastic having particles of conductive carbon dispersed therein.

19. The bipolar electrode of claim 18, wherein the metal oxide is a tungsten oxide of the formula $WO_{3-x}$, wherein x is from 0.001 to 1, the conductive carbon is carbon black, and the sulfuric-acid resistant plastic is high-density polyethylene.

* * * * *